United States Patent Office 3,069,441
Patented Dec. 18, 1962

3,069,441
PROCESS FOR THE HYDRATION OF
EPOXY ESTERS
Gerhard Maerker, Philadelphia, and William S. Port, Norristown, Pa., assignors to the United States of America as represented by the Secretary of Agriculture
No Drawing. Filed July 21, 1961, Ser. No. 126,810
13 Claims. (Cl. 260—398)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to the hydration of epoxy functions to produce hydroxyl groups and has among its objects the conversion of epoxy esters to hydroxy esters. By epoxy ester is meant an ester in which either the alcohol or acid moiety or both moieties possess one or more epoxy functions.

Hydroxy esters are useful as wetting agents, emulsifiers, chemical intermediates, and as reactive monomers or internal plasticizers in the preparation of polyester, urethane and other types of resins.

While epoxy groups can be hydrated by causing their reaction with water in the presence of catalytic amounts of acids or bases, usually carried out at elevated temperatures, these reaction conditions also cause the hydrolysis of esters into their component acids and alcohols. Hence, a procedure which will allow the ester linkage to remain intact while the epoxy function is hydrated is highly desirable.

In general, according to the present invention hydration is obtained by contacting epoxy esters with a concentrated aqueous solution of a strong acid at a temperature in the range from about 0 to 50° C. for a brief period of time to produce hydroxy esters.

The epoxy esters which are most conveniently prepared, handled and hydrated in accordance with principles of our invention contain at least one epoxy group

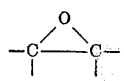

and one carboxylic ester group. The epoxy group can be either terminal or non-terminal and can be located either in the carboxylic acid portion or the alcohol portion of the ester.

The epoxy esters which can be hydrated by the process of our invention can be mono-, di- or polyfunctional esters, i.e. they can be esters of mono-, di-, or polycarboxylic acids and mono-, di-, or polyhydric alcohols.

The carboxylic acids from which the epoxy esters are derived can be aliphatic, cycloaliphatic, aromatic or heterocyclic, and can be saturated or unsaturated. Preferred acids are those containing not more than 22 carbon atoms per carboxylic acid radical such as acrylic acid, polyacrylic acid, 2,3-epoxypropionic acid, stearic acid, oleic acid, 9,10-epoxystearic acid, ricinoleic acid, pelargonic acid, azelaic acid, sebacic acid, adipic acid, succinic acid, phthalic acid, benzoic acid, dimerized linoleic acid, trimerized linoleic acid, tetrahydrophthalic acid, cyclohexanecarboxylic acid, nicotinic acid, quinolinic acid, diepoxystearic acid, and the like.

The alcohols from which the epoxy esters are derived can be aliphatic or cycloaliphatic and can be saturated or unsaturated. Preferred are the alcohols containing not more than 22 carbons per hydroxyl group such as 1-octadecanol, 9,10-epoxy-1-octadecanol, oleyl alcohol, linoleyl alcohol, 9,10,12,13-diepoxy-1-octadecanol, ricinoleyl alcohol and the like. Particularly prefered are those alcohols containing not more than 8 carbon atoms per alcohol group such as methanol, ethanol, ethylene glycol, glycerol, glycidol, methylol cyclohexane, 2,3-epoxybutanediol and the like.

The strong acid which is utilized by our process to aid in the selective hydration of epoxy groups in epoxy esters can be any acid strong enough to protonate the weakly basic epoxy oxygen to a considerable extent. Since the strength of an acid varies with the medium in which the acid is dissolved, the choice of a particular acid to be employed is determined by the type of epoxy ester to be treated and by the specific solvent, if a solvent is utilized. Preferred are acids such as sulfuric acid, nitric acid, perchloric acid, methanesulfonic acid, benzenesulfonic acid, naphthalenesulfonic acid, trifluoroacetic acid, fluoboric acid and the like.

Our invention can be executed in a wide variety of manners depending in the specific epoxy ester to be treated, on the particular acid employed, and on the particular operating conditions chosen. In accordance with a preferred mode of operation the epoxy ester is dissolved in a non-aqueous, non-reactive solvent prior to treatment. By a non-reactive solvent, we mean one which does not form a reaction product with the epoxy ester under the reaction conditions. The employment of a solvent is convenient in many cases, but is not essential to the operation of our process unless the strong acid and the epoxy ester are not miscible under the reaction conditions. Solvents which can be chosen, if desired, include benzene, toluene, xylene, hexane, cyclohexane, heptane, ether carbon tetrachloride, chloroform, methylene chloride nitromethane, nitrobenzene, chlorobenzene, tetrahydrofuran, dioxane or any other non-aqueous, non-reactive compound which is suitable. Particularly preferred solvents are low-boiling, non-reactive, polar solvents such as acetone, methyl acetate, ethyl acetate, dioxane and the like.

In further execution of our preferred method, the solution of the epoxy ester is introduced into a suitable reaction vessel which can be provided with means for agitation of the reaction mixture, if desired. The strong acid is then added to the epoxy ester solution, with external cooling of the mixture, if desired.

The strong acid which aids in the selective hydration of epoxy esters can be introduced into the reaction mixture either in the anhydrous state or as an aqueous solution in which the acid concentration may be varied between 10% and 100%. If an aqueous solution of the acid is employed, the preferred range of acid concentration is 50% to 100%. In many cases, best results are obtained if the aqueous acid solution has an acid concentration of 70% or higher.

Since the strong acid which aids in the selective hydration of epoxy esters is not consumed in the reaction, the amount of strong acid to be added to the reaction mixture depends on the results to be achieved. If desired, less than the stoichiometrically required amount of strong acid can be employed with excellent results, but sufficient water must be added to the reaction mixture to effect complete hydration of the epoxy groups. A more rapid rate of reaction is achieved by employment of an amount of strong acid equal to or greater than that required stoichiometrically.

We prefer to execute our invention in a temperature range of from about 0° C. to about 50° C. Higher temperatures and shorter times of contact of the reactants can be resorted to when it is desirable to accelerate the reaction. Usually at temperatures above 50° C. the yield of desired product is decreased due to the hydrolysis of ester functions and due to other undesirable side reactions.

When the epoxy ester is treated by our method with an excess amount of anhydrous strong acid, only a brief reaction period is required, the exact length of the period varying with the particular epoxy ester, the specific type and amount of strong acid chosen, and the reaction temperature employed. This reaction period is then followed by the addition of sufficient water to hydrate all of the epoxy groups, although the amount of water actually used commonly exceeds that requirement considerably.

After the epoxy ester has been in contact with aqueous strong acid for a brief period, the reaction is complete. Since we prefer to execute our invention employing a solvent, the reaction products are usually obtained in a solution or mixture with varying amounts of water, acid and by-products. In the case that recovery of the anhydrous product is desired, this can be accomplished by any convenient method. If the solvent used was immiscible with water, then one method which can be employed to isolate the anhydrous product is to separate the aqueous acid phase from the organic phase and washing the latter with water or with an aqueous solution of any basic material, such as sodium hydroxide, potassium hydroxide, sodium carbonate, sodium bicarbonate, calcium carbonate, barium carbonate, magnesium carbonate, potassium carbonate, ammonia, amines or the like, drying the organic phase and then isolating the product from its solution by distillation, extraction, crystallization, adsorption, or other means. Other suitable methods of separation can also be used to isolate the anhydrous product from the reaction mixture.

If the solvent used in the execution of our invention is one which is miscible or partly miscible with water, the isolation of the anhydrous product or products can also be effected by any means which are suitable to the operator, as for instance removal of the water and of acidic components by extraction, distillation, adsorption, ion exchange, distillation, crystallization, sublimation and the like. We prefer to execute our invention by extracting the desired products from the reaction mixture with a solvent which is poorly miscible with water and isolating the anhydrous product by washing, drying and distilling the resulting solution.

The exact nature of the reaction product derived from the operation of our process is highly dependent upon reaction conditions. In applying our invention to the hydration of glycidyl stearate, for instance, the reaction was carried out in 1,4-dioxane solution. If it is desirable to separate the two product esters, any known suitable means may be used.

The practice of the invention is exemplified with epoxy esters in which the epoxy function is in the alcohol moiety of the compound, for which purpose glycidyl esters were selected as representative, and with epoxy esters in which the epoxy function is in the acid moiety of the compound, as demonstrated in Examples 15 and 19. The examples are presented to illustrate the practice of the invention and are not to be considered as limitations thereof.

The following procedure is typical of the preferred method. The epoxy ester was dissolved in the selected solvent and the temperature adjusted. Acid was then added to the solution of epoxy ester and the resulting mixture was allowed to stand at the chosen temperature for a short period of time, usually 10 minutes, with occasional agitation. In most of the examples water was then added and the resulting mixture again allowed to stand with occasional agitation. The reaction mixture was then poured into the excess benzene, the aqueous layer which separated was drawn off, and the benzene solution was washed successively with 5% sodium bicarbonate solution and with water. The benzene solution was dried over calcium sulfate and the solvent then removed by distillation. The product was analyzed to determine completeness of reaction and yield of hydroxy ester.

EXAMPLES 1 TO 5

*Hydration of Glycidyl Stearate in Acetone With Sulfuric Acid*

The data for these examples are summarized in Table I. In each instance 5.0 grams of glycidyl stearate (oxirane oxygen: 4.42%, Sap. No. 165.4) in acetone was treated with sulfuric acid (amount and concentration shown in table) and the resulting solution was either treated with water for 10 minutes or poured into benzene and the latter washed with water. The hydroxy ester product, essentially monostearin (2,3-dihydroxypropyl stearate) and distearin (considered to be the α,α'-isomer), was obtained in yields of about 90 to 97%. The monostearin and distearin can be separated or retained as a mixture, depending upon the intended use.

TABLE I
[Hydration of glycidyl stearate in acetone with sulfuric acid]

| Example No. | Temp., °C. | Acetone, ml. | $H_2SO_4$ treatment | | | $H_2O$ treatment, ml. | Product | | | | | | |
|---|---|---|---|---|---|---|---|---|---|---|---|---|---|
| | | | Acid | | Time, min. | | Weight, gm. | Oxirane oxygen, percent | A.N. | Sap. No.[1] | OH,[1] percent | Monostearin, percent yield | Distearin, percent yield |
| | | | Moles/ mole epoxide | Conc., percent | | | | | | | | | |
| 1 | 45 | 75 | 1.36 | 96.0 | 10 | 8 | 4.8 | <0.1 | 3.3 | 164.5 | 8.37 | 52.1 | 39.7 |
| 2 | 20 | 75 | 1.16 | 96.0 | 10 | 8 | 5.0 | <0.1 | 2.5 | 158.8 | 8.17 | 76.0 | 18.5 |
| 3 | 20 | 75 | 1.36 | 96.0 | 10 | (2) | 4.7 | <0.1 | 4.0 | 166.5 | 7.41 | 27.7 | 63.5 |
| 4 | 20 | 100 | 1.36 | 84.5 | 30 | (2) | 4.9 | <0.1 | 7.2 | 170.7 | 6.63 | 23.3 | 73.7 |
| 5 | 20 | 100 | 1.36 | 64.5 | 30 | (2) | 5.0 | 0.2 | 8.5 | 173.5 | 8.56 | 33.3 | 62.1 |

[1] Pure monostearin: Sap. No. 156.5; OH 9.49%.
[2] No separate treatment with water, but water washing of benzene solution.

product mixture can contain as the principal component either α-monostearin (2,3-dihydroxypropyl stearate) or α,α'-distearin (2-hydroxypropyl-1,3-distearate) depending on the choice of reaction conditions such as reaction temperature, reaction time, water content, reagent ratio and the method chosen for combining the reagents. The composition of the reaction products mixture is further influenced by the choice of the particular solvent used. For example, under a particular set of operating conditions the reaction products can contain predominantly α,α'-distearin if the reaction was carried out in benzene solution or it can contain mostly α-monostearin if the reaction was carried out in 1,4-dioxane solution.

EXAMPLES 6 TO 8

*Hydration of Glycidyl Stearate in Acetone With Various Acids*

In each example 5.0 grams of glycidyl stearate (oxirane oxygen: 4.42%, Sap. No. 165.4) was allowed to stand with a strong acid and with water according to conditions summarized in Table II. The hydroxy ester products were separated and analyzed. Hydroxy esters were obtained in each example, practical grade methanesulfonic acid (Example 7) giving an excellent yield of monostearin.

EXAMPLES 9 TO 14

*Hydration of Glycidyl Stearate in Various Solvents With Sulfuric Acid*

In each of the following examples (Table III) 5.0 g. of glycidyl stearate (oxirane oxygen: 4.42%; Sap. No. 165.4) dissolved in the specified solvent was treated with 2.9 g. (1.9 moles per mole epoxide) of conc. $H_2SO_4$ for 10 min. The reaction mixture was then treated with 12 ml. water for 10 min., poured into benzene, and the benzene solution worked up as usual.

EXAMPLES 15 TO 19

*Hydration of Various Epoxy Esters in Acetone With Sulfuric Acid*

In each of the following examples (Table IV) 5.0 gm. of epoxy ester (10.0 g. in run 19) in acetone was treated first with sulfuric acid and then with water, each for 10 min. at 20° C. The reaction mixtures were poured into water and worked up as usually.

EXAMPLE 20

*Hydration of Glycidyl Stearate in 1,4-Dioxane With Sulfuric Acid*

To a mechanically stirred solution of 5.0 g. of glycidyl stearate (oxirane oxygen: 4.42%, Sap. No. 165.4) in 60 ml. of 1,4-dioxane at 15° C. was added, at a dropwise rate, a solution of 1.1 ml. concentrated sulfuric acid in 15 ml. of 1,4-dioxane, while the temperature was maintained at 15° C. Ten minutes after the start of the sulfuric acid addition, 10 ml. of water were added at a rapid dropwise rate, with the temperature maintained at 15° C. Ten minutes after start of the water addition, the reaction mixture was poured into 200 ml. benzene, the aqueous acid layer separated and the benzene phase washed successively with 25 ml. of 5% sodium bicarbonate solution and with 50 ml. water. The benzene solution was dried over calcium sulfate and evaporated on the steam bath to yield 4.95 g. crude product (oxirane oxygen: none). Chromatographic analysis demonstrated that the crude material contained 89% monostearin and 8% distearin.

We claim:

1. A process for preparing an hydroxy ester comprising contacting an epoxy ester with a concentrated aqueous solution of a strong acid at a temperature in the range of about 0 to about 50° C. for a brief period of time to produce an hydroxy ester and separating the hydroxy ester from the reaction mixture.

2. A process for preparing an hydroxy ester comprising contacting an epoxy ester, in solution in a non-reactive polar solvent, with a concentrated aqueous solution of a strong acid at a temperature in the range of about 0 to about 50° C. for a brief period of time to produce an hydroxy ester and separating the hydroxy ester from the reaction mixture.

3. A process for preparing an hydroxy ester comprising contacting an epoxy ester, in solution in a non-reactive polar solvent, with a strong acid at a temperature in the range of about 0 to about 50° C. for a brief period of

TABLE II

[Hydration of glycidyl stearate in acetone with various acids]

| Example No. | Temp., °C. | Acetone, ml. | Acid treatment acid | | | | $H_2O$ treatment | | Product | | | | |
|---|---|---|---|---|---|---|---|---|---|---|---|---|---|
| | | | Comp'd. | Mole/ moles epoxide | Conc., percent | Time, min. | Am't., ml. | Time, min. | Weight, gm. | Oxirane oxygen, percent | A.N. | Sap. No.[1] | OH,[1] percent |
| 6 | 28 | 75 | $HClO_4$ | 0.40 | 70 | 5 | 8 | 35 | 5.1 | <0.1 | 1.4 | 153.4 | 7.73 |
| 7 | 20 | 75 | $CH_3SO_3H$ | 2.38 | ([2]) | 12 | 8 | 8 | 4.8 | 0.13 | 1.4 | 156.3 | 8.27 |
| 8 | 20 | 175 | $HBF_4$ | 2.72 | 48 | 30 | 10 | 6 | 5.5 | <0.1 | 0.6 | 139.6 | 3.40 |

[1] Pure monostearin. Sap. No. 156.5; OH 9.49%.    [2] Practical grade.

TABLE III

[Hydration of glycidyl stearate in various solvents with sulfuric acid]

| Ex. No. | Solvent | Treatment temp., °C. | Product | | | | |
|---|---|---|---|---|---|---|---|
| | | | Weight gm. | Oxirane oxygen, percent | A.N. | Sap. No.[1] | OH,[1] percent |
| 9 | Methyl acetate | 25 | 4.4 | <0.1 | 6.5 | 164.3 | 6.69 |
| 10 | Abs. ether | 28 | 3.0 | <0.1 | 14.1 | 176.7 | 4.69 |
| 11 | Methylene chloride | 20 | 3.8 | <0.1 | 18.2 | 176.0 | 5.77 |
| 12 | Benzene | 20 | 3.6 | <0.1 | 20.9 | 178.3 | 4.98 |
| 13 | Nitromethane | 30–45 | 3.1 | <0.1 | 26.7 | 180.3 | 4.04 |
| 14 [2] | 1,4-dioxane | 10 | 4.9 | 0.15 | 4.8 | | |

[1] Pure monostearin: Sap. No.: 156.5; OH: 9.49%.
[2] Treatment with only 2.0 g. conc. $H_2SO_4$ for 5 min.

TABLE IV

[Hydration of various epoxy esters in acetone with sulfuric acid]

| Example No. | Epoxy ester | | | $H_2SO_4$, moles/ equiv. epoxide | Product | | | | | | |
|---|---|---|---|---|---|---|---|---|---|---|---|
| | Compound | Oxirane oxygen, percent | Sap. No. | | Weight gm. | Oxirane oxygen, percent | A.N. | Sap. No. | | OH | |
| | | | | | | | | Theory | Found | Theory, percent | Found, percent |
| 15 | Methyl 9,10-epoxystearate | 4.92 | 180.6 | 1.19 | [1] 6.4 | <0.1 | 24.0 | 169.8 | 193.2 | 10.29 | 4.10 |
| 16 | Glycidyl oleate | 4.77 | [2] 201.6 | 1.82 | 4.8 | <0.1 | 10.4 | 157.4 | [2] 186.0 | 9.54 | 7.43 |
| 17 | Diglycidyl sebacate | 9.64 | 363.0 | 1.13 | 5.0 | <0.1 | 16.9 | 320.2 | 325.9 | 19.42 | 12.26 |
| 18 | Glycidyl ricinoleate | 3.74 | [2] 170.0 | 1.35 | 4.7 | <0.1 | 9.7 | 150.6 | [2] 169.3 | 13.70 | 10.31 |
| 19 | Epoxidized soybean oil | 6.44 | 180.8 | 1.64 | 11.9 | <0.1 | 15.2 | 168.6 | 165.6 | 12.77 | 3.46 |

[1] Contains incompletely removed $H_2SO_4$.
[2] Excessively high sap. no. due to presence of hydrolyzable Cl in starting material.

polar solvent, with a strong acid at a temperature in the range of about 0 to about 50° C. for a brief period of time, combining the resulting mixture with water at a temperature in said range to produce an hydroxy ester, and separating the hydroxy ester from the reaction mixture.

4. The process of claim 2 in which the epoxy function of the epoxy ester is non-terminally located.

5. The process of claim 3 in which the epoxy function of the epoxy ester is non-terminally located.

6. The process of claim 2 in which the epoxy function of the epoxy ester is terminally located.

7. The process of claim 3 in which the epoxy function of the epoxy ester is terminally located.

8. The process of claim 6 in which the epoxy ester is a mono-glycidyl ester.

9. The process of claim 7 in which the epoxy ester is a mono-glycidyl ester.

10. The process of claim 6 in which the epoxy ester is a poly-glycidyl ester.

11. The process of claim 7 in which the epoxy ester is a poly-glycidyl ester.

12. A compound from the class consisting of 2,3-dihydroxypropyl esters of polybasic acids.

13. Bis(2,3-dihydroxypropyl)sebacate.

References Cited in the file of this patent

UNITED STATES PATENTS

| 2,761,870 | Payne et al. | Sept. 4, 1956 |
| 2,980,715 | Sheers et al. | Apr. 18, 1961 |

OTHER REFERENCES

Milas et al., J. Am. Chem. Soc., 58, 1302–1303 (1936).
Kienle et al., J. Am. Chem. Soc., 63, 481–484 (1941).
Swern, J. Am. Chem. Soc., 70, 1235–1240 (1948).
Swern, Chemical Reviews, 45, 25, 26, 63 (1949).